United States Patent
Young et al.

(10) Patent No.: US 7,789,783 B2
(45) Date of Patent: Sep. 7, 2010

(54) INVERTED TOOTH CHAIN SYSTEM WITH INSIDE FLANK ENGAGEMENT

(75) Inventors: James D. Young, Chesaning, MI (US); Todd W. Richardson, Macomb, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 1064 days.

(21) Appl. No.: 11/228,186

(22) Filed: Sep. 16, 2005

(65) Prior Publication Data

US 2006/0068959 A1    Mar. 30, 2006

Related U.S. Application Data

(60) Provisional application No. 60/631,748, filed on Nov. 30, 2004, provisional application No. 60/612,961, filed on Sep. 24, 2004.

(51) Int. Cl.
*F16G 13/00* (2006.01)
*F16G 13/04* (2006.01)

(52) U.S. Cl. .................. 474/213; 474/212; 474/215

(58) Field of Classification Search ......... 474/212–217, 474/152, 157; F16G 13/00
See application file for complete search history.

(56) References Cited

U.S. PATENT DOCUMENTS

| | | | |
|---|---|---|---|
| 1,598,906 A | 9/1926 | Dull | |
| 1,693,431 A | 11/1928 | Behning | |
| 3,495,468 A | 2/1970 | Griffel | |
| 3,535,871 A | 10/1970 | Jeffrey | |
| 3,636,788 A | 1/1972 | Jeffrey | |
| 4,168,634 A | 9/1979 | Griffel | |
| 4,509,323 A | 4/1985 | Ledvina et al. | |
| 4,509,937 A * | 4/1985 | Ledvina et al. | 474/213 |
| 4,758,209 A | 7/1988 | Ledvina | |
| 4,758,210 A | 7/1988 | Ledvina | |
| 4,759,740 A | 7/1988 | Cradduck | |
| 4,764,158 A | 8/1988 | Honda et al. | |
| 4,832,668 A | 5/1989 | Ledvina et al. | |
| 4,906,224 A | 3/1990 | Reber | |
| 4,915,675 A | 4/1990 | Avramidis | |
| 4,915,676 A | 4/1990 | Komeya | |
| 5,154,674 A | 10/1992 | Avramidis et al. | |
| 5,236,400 A | 8/1993 | Tsuyama | |
| 5,267,910 A | 12/1993 | Maruyama et al. | |
| 5,419,743 A | 5/1995 | Takeda et al. | |
| 5,453,059 A | 9/1995 | Avranudis et al. | |
| 5,464,374 A | 11/1995 | Mott | |
| 5,628,702 A | 5/1997 | Kotera | |

(Continued)

FOREIGN PATENT DOCUMENTS

JP    H1-119964    8/1989

*Primary Examiner*—Robert A Siconolfi
*Assistant Examiner*—Stephen Bowes
(74) *Attorney, Agent, or Firm*—Fay Sharpe LLP

(57) ABSTRACT

An inverted tooth chain includes a plurality of rows. The inside flanks of the leading toes of each chain row project outwardly relative to the outside flanks of the trailing toes of the preceding chain row by a maximum amount $\lambda_{MAX}$ wherein: $0.010 \times P \leq \lambda_{MAX} \leq 0.020 \times P$ or, preferably, $0.015 \times P \leq \lambda_{MAX} \leq 0.020 \times P$, where P = chain pitch. The inverted tooth chain is meshed with a sprocket to define a system having a maximum chordal rise distance CR wherein said chordal motion in the inverted tooth chain upstream relative to said sprocket is less than 40% of said maximum chordal rise distance CR.

16 Claims, 10 Drawing Sheets

U.S. PATENT DOCUMENTS

| | | |
|---|---|---|
| 5,758,484 A | 6/1998 | Ledvina et al. |
| 5,803,854 A | 9/1998 | Tada et al. |
| 6,077,181 A | 6/2000 | Kanehira et al. |
| 6,112,510 A | 9/2000 | Ichikawa et al. |
| 6,155,944 A | 12/2000 | Matsuda |
| 6,155,945 A | 12/2000 | Matsuda |
| 6,159,122 A | 12/2000 | Kanehira et al. |
| 6,168,543 B1 | 1/2001 | Matsuda |
| 6,186,920 B1 | 2/2001 | Reber |
| 6,244,983 B1 | 6/2001 | Matsuda |
| 6,272,835 B1 | 8/2001 | Horie et al. |
| 6,325,735 B1 | 12/2001 | Kanehira et al. |
| 6,334,828 B1 | 1/2002 | Suzuki |
| 6,416,436 B1 | 7/2002 | Kanehira et al. |
| 6,432,011 B1 | 8/2002 | Kanehira et al. |
| 6,450,910 B1 | 9/2002 | Matsumoto et al. |
| 6,461,263 B2 | 10/2002 | Suzuki et al. |
| 6,533,107 B2 | 3/2003 | Suzuki et al. |
| 6,533,691 B2 | 3/2003 | Horie et al. |
| 6,663,522 B2 | 12/2003 | Horie |
| 6,733,410 B2 | 5/2004 | Saito |
| 6,796,920 B2 | 9/2004 | Horie et al. |
| 2002/0058561 A1 | 5/2002 | Kanehira et al. |
| 2002/0119853 A1 | 8/2002 | Horie |
| 2003/0064845 A1* | 4/2003 | Saito .................. 474/212 |
| 2003/0119614 A1* | 6/2003 | Saitoh .................. 474/113 |
| 2003/0125146 A1* | 7/2003 | Saitoh .................. 474/212 |
| 2004/0097314 A1 | 5/2004 | Kotera |
| 2004/0110591 A1 | 6/2004 | Kotera |
| 2004/0166978 A1 | 8/2004 | Matsuda et al. |

\* cited by examiner

INVERTED TOOTH CHAIN SYSTEM WITH INSIDE FLANK ENGAGEMENT

CROSS-REFERENCE TO RELATED APPLICATION

This application claims priority from and benefit of the filing date of U.S. provisional application Ser. No. 60/631,748 filed Nov. 30, 2004 and also claims priority from and benefit of the filing date of U.S. provisional application Ser. No. 60/612,961 filed Sep. 24, 2004. These applications, U.S. provisional application Ser. No. 60/631,748 filed Nov. 30, 2004 and U.S. provisional application Ser. No. 60/612,961 filed Sep. 24, 2004, are hereby expressly incorporated by reference this specification.

BACKGROUND

Inverted tooth chains have long been used to transmit power and motion between shafts in automotive applications and they are conventionally constructed as endless chains with ranks or rows of interleaved inside links or link plates each having a pair of toes, and each having two apertures that are aligned across a link row to receive pivot pins (e.g., straight pins, rocker joints, etc.) to join the rows pivotally and to provide articulation of the chain as it drivingly engages the sprocket teeth either at the inside flanks ("inside flank engagement") or at the outside flanks ("outside flank engagement") of the link plate toes at the onset of meshing with the driving and driven sprockets. Although both meshing styles have been used for automotive timing drives, inside flank engagement is more commonly used for these drives. Guide link plates are located on opposite sides of alternating rows of inside link plates in order to position the chain laterally on the sprockets.

Chain-sprocket impact at the onset of meshing is the dominant noise source associated with chain drive systems and it occurs as the chain links leave the span and collide with a sprocket tooth at engagement. The complex dynamic behavior of the meshing phenomenon is well known in the art and the magnitude of the chain-sprocket meshing impact is influenced by various factors, of which polygonal effect (referred to as "chordal action" or "chordal rise") is known to induce a transverse vibration in the "free" or unsupported chain span located upstream from the sprocket as the chain approaches the sprocket along a tangent line. This chordal action occurs as the chain enters the sprocket from the taut span during meshing and it will induce chain motion in a direction perpendicular to the chain travel but in the same plane as the chain and sprockets. It is known that chordal action and the resulting inherent undesirable oscillatory chain motion will add to the severity of the chain-sprocket meshing impact and further contribute to the related chain engagement noise levels.

FIGS. 1A and 1B serve to illustrate the chordal rise for a sprocket in which chordal rise CR is conventionally defined as the displacement of a chain pin center C (i.e., axis of articulation of a pin, rocker joint etc.) as it moves through an angle $\alpha/2$, where:

$$CR = r_p - r_c = r_p[1 - \cos(180°/N)]$$

and where $r_c$ is the chordal radius or the distance from the sprocket center to a sprocket pitch chord of length P; $r_p$ is the theoretical pitch radius of the sprocket, i.e., one-half of the pitch diameter PD; N is the number of sprocket teeth; and $\alpha$ is equal to the sprocket tooth angle or $360°/N$. FIG. 1A shows the chain pin center C at a first position where it has just meshed with the sprocket and where its center is simultaneously aligned with both the tangent line TL along which the chain approaches the sprocket for meshing and the sprocket pitch diameter PD. FIG. 1B illustrates the location of the same pin center C after the sprocket has rotated through the angle $\alpha/2$, where it can be seen that the pin center C must be transversely displaced in order to continue its travel around the sprocket wrap, and this transverse displacement of the pin center results in a corresponding displacement of the upstream chain span and tangent line TL thereof. This repeated transverse displacement of the chain pin centers C as they move through the chordal rise serves to induce undesired vibration in the approaching unsupported chain span located upstream from the sprocket which increases meshing noise.

One attempt to eliminate undesired chordal action of the chain is described in U.S. Pat. No. 6,533,691 to Horie et al. Horie et al. disclose an inverted tooth chain wherein the inside flanks of each link plate are defined with a compound radius profile intended to smooth the movement of the inside flanks from initial contact with the sprocket to the fully meshed (chordal) position. The chain disclosed by Horie et al. is also intended to lift the chain intentionally a distance "h" (see FIG. 7 of Horie et al.) above the tangent line in an effort to tension the slack side of the system to eliminate vibration in the slack strand of the chain.

Chain lift is also intentionally increased in the system disclosed in published U.S. patent application no. 2004/0110591 by Kotera. There, the prominence of the inside flanks of the chain relative to the respective outside flanks of adjacent link plates is defined as a function of the chain pitch P. In particular, the maximum projection of the inside flank $\delta_{max}$ relative to the related outside flank is said to fall in the range of $0.021 \times P \leq \delta_{max} \leq 0.063 \times P$ and most preferably in the range of $0.035 \times P \leq \delta_{max} \leq 0.063 \times P$ in an effort to restrain transverse vibration of the chain by lifting the chain above the tangent line. By way of example, according to the Kotera application, the maximum projection of the inside flank $\delta_{max}$ relative to the related outside flank for a 7.7 millimeter (mm) chain pitch P will be in the range of $0.162 \text{ mm} \leq \delta_{max} \leq 0.485$ mm.

It is believed that these conventional approaches to minimize vibration resulting from chordal action do not optimize chain/sprocket meshing dynamics, and may, in fact, be detrimental. In an effort to compensate for the chordal action of the chain and sprocket by intentionally introducing chain lift, the chain is nevertheless forced out of a straight line path. Thus, it has been deemed desirable to provide an inverted tooth chain and sprocket system with inside flank engagement that affords minimal perpendicular chain movement in the span to minimize transverse vibration in the unsupported chain span during the meshing process.

SUMMARY

In accordance with a first aspect of the invention, a chain and sprocket drive system includes a sprocket with a plurality of teeth, wherein each tooth comprises an engaging flank and a disengaging flank. The system further includes an inverted tooth chain meshed with the sprocket. The sprocket and chain define a maximum chordal rise distance CR, and the inverted tooth chain includes a plurality of rows of inside links that each articulate relative to a preceding row and a succeeding row about pivot axes spaced at a chain pitch P. Each of the rows includes leading inside toe flanks and trailing outside toe flanks, wherein the leading inside toe flanks of each row project outwardly relative to trailing outside toe flanks of the preceding row by a maximum projection amount $\lambda_{MAX}$ when said inverted tooth chain is pulled straight so that: the engaging flank of each sprocket tooth makes initial meshing contact with said inverted tooth chain only on the leading inside flanks of a row of said chain; for each row of the chain that is fully meshed with the sprocket, its trailing outside flanks are in contact with the engaging flank of a sprocket tooth and its leading inside flanks are separated from an engaging flank of a preceding sprocket tooth; and, a strand of the chain located upstream from the sprocket exhibits chordal motion that is no more than 40% of the maximum chordal rise distance CR.

In accordance with another aspect of the present development, an inverted tooth chain for a chain and sprocket drive system includes a plurality of rows of inside links interconnected to each other in an endless fashion and that each articulate relative to a preceding row and a succeeding row about pivot axes spaced at a chain pitch P. Each of the rows includes leading inside toe flanks and trailing outside toe flanks, wherein the leading inside toe flanks of each row project outwardly relative to trailing outside toe flanks of the preceding row by a maximum projection amount $\lambda_{MAX}$ when the inverted tooth chain is pulled straight so that the engaging flank of an associated sprocket tooth makes initial meshing contact with the inverted tooth chain only on the leading inside flanks of a row of the chain. The maximum inside flank projection amount $\lambda_{MAX}$ satisfies the relationship: $0.010 \times P \leq \lambda_{MAX} \leq 0.020 \times P$.

In accordance with another aspect of the present invention, a method for meshing an inverted tooth chain with a sprocket includes rotating a sprocket including a plurality of teeth, wherein each tooth comprises an engaging flank and a disengaging flank. The method also includes meshing an inverted tooth chain with the sprocket. The sprocket and chain define a maximum chordal rise distance CR, and the inverted tooth chain comprises a plurality of rows of inside links that each articulate relative to a preceding row and a succeeding row about pivot axes spaced at a chain pitch P. Each of the rows includes leading inside toe flanks and trailing outside toe flanks. The leading inside toe flanks of each row project outwardly relative to trailing outside toe flanks of the preceding row by a maximum projection amount $\lambda_{MAX}$ when the inverted tooth chain is pulled straight. The maximum inside flank projection amount $\lambda_{MAX}$ satisfies the relationship: $0.015 \times P \leq \lambda_{MAX} \leq 0.020 \times P$. The method further includes making initial meshing contact between the engaging flank of a first sprocket tooth and the inverted tooth chain only on the leading inside flanks of a first row of the chain and continuing to rotate the sprocket so that a row of the chain that precedes the first row becomes fully meshed with the sprocket with its trailing outside flanks in contact with the first sprocket tooth and so that the leading inside flanks of the first row separate from the first sprocket tooth.

In accordance with another aspect of the present invention, an inverted tooth chain includes a plurality of rows each pivotally connected to a preceding row and a following row. Each row includes a plurality of inside links aligned with each other and interleaved with the inside links of its preceding and following rows. Each row pivots relative to its preceding and following rows about pivot axes spaced from each other at a pitch distance. Each of the inside links includes a leading toe and a trailing toe. Each leading toe and trailing toe includes an inside flank and an outside flank interconnected by a tip, and the inside flanks of the leading and trailing toes are joined by a crotch. The leading toes of each chain row overlap the trailing toes of a preceding chain row so that, when a row and a preceding row are positioned in a straight line, the inside flanks of the leading toes of said chain row project outwardly relative to the outside flanks of the trailing toes of said preceding chain row by a maximum amount $\lambda_{MAX}$ wherein $0.010 \times P \leq \lambda_{MAX} \leq 0.020 \times P$.

In accordance with another aspect of the present development, an inverted tooth chain includes a plurality of rows pivotally connected to each other in an endless fashion and defining a chain pitch P between pivot axes about which the rows articulate relative to each other. Each row includes a plurality of link plates wherein each link plate comprises a leading toe and a trailing toe. Each toe is defined by an inside flank and an outside flank connected by a tip, with the inside flanks of the leading and trailing toes oriented toward each other and connected by a crotch. The links of each row are interleaved with the links of a preceding row and with the links of a succeeding row, with the leading toes of each row overlapped with the trailing toes of the preceding row such that, when the chain is pulled straight, the inside flanks of the leading toes project outwardly from the outside flanks of the overlapped trailing toes by an a maximum amount $\lambda_{MAX}$ wherein $0.010 \times P \leq \lambda_{MAX} \leq 0.020 \times P$.

BRIEF DESCRIPTION OF DRAWINGS

The invention comprises various components and arrangements of components, and various steps and arrangements of steps, preferred embodiments of which are disclosed herein with reference to the accompanying drawings wherein.

DETAILED DESCRIPTION OF THE INVENTION

Figure 2A:
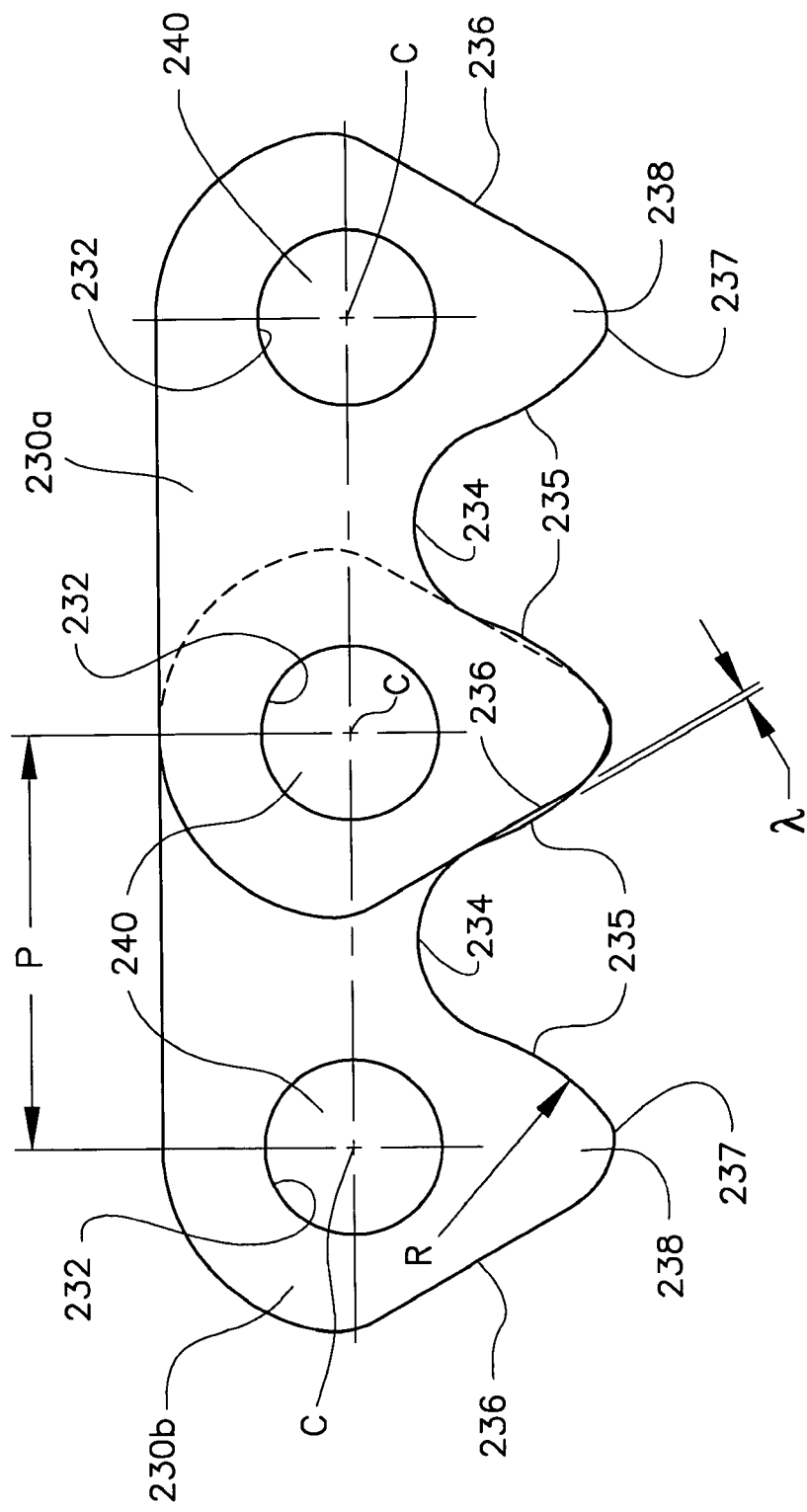
FIG. 2A is an enlarged illustration of first and second rows of inside link plates showing a preferred inside flank projection in accordance with the present invention.
Figure 2B:
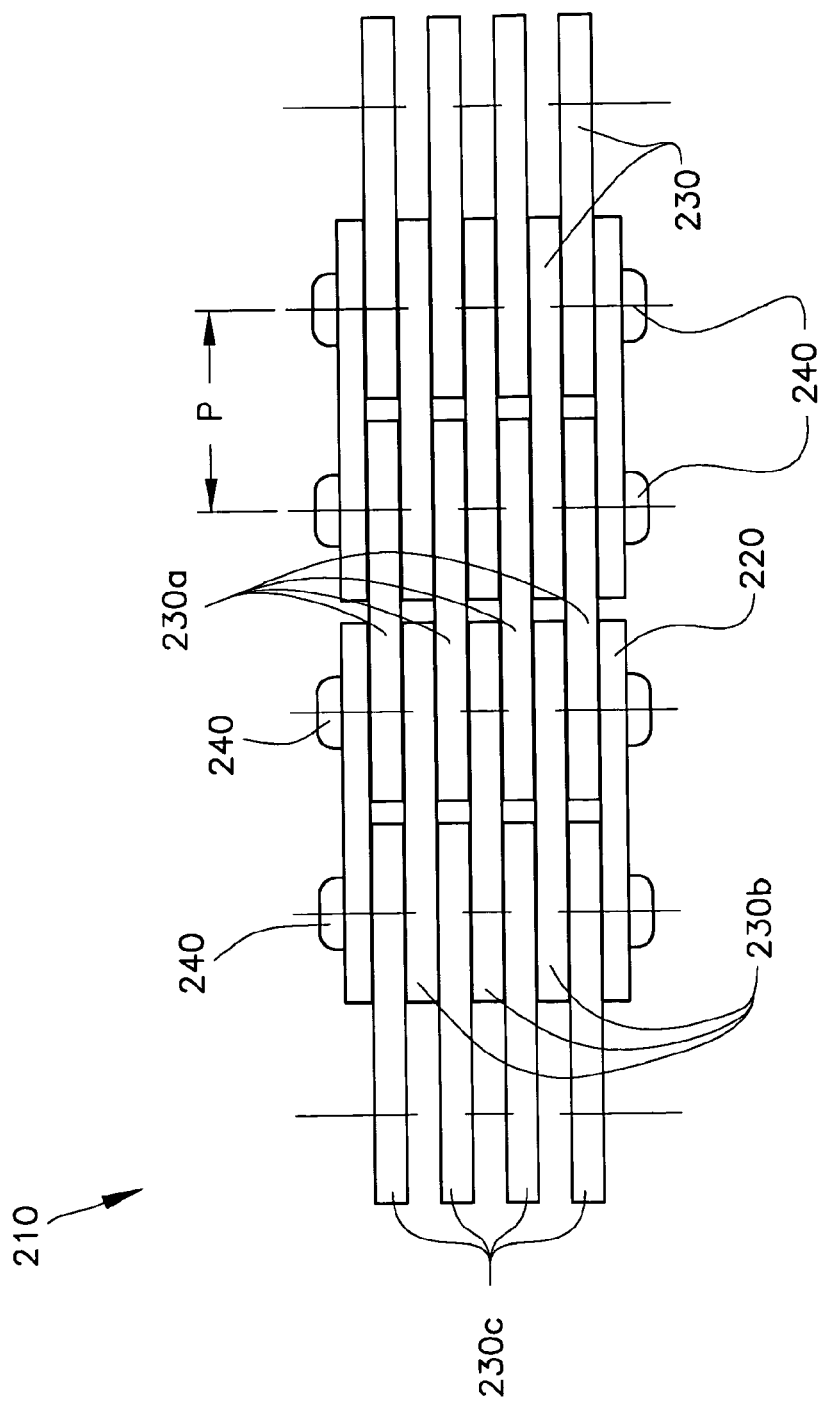
FIG. 2B is a plan view of a chain segment incorporating the inside link plates of FIG. 2A.
Figure 3:
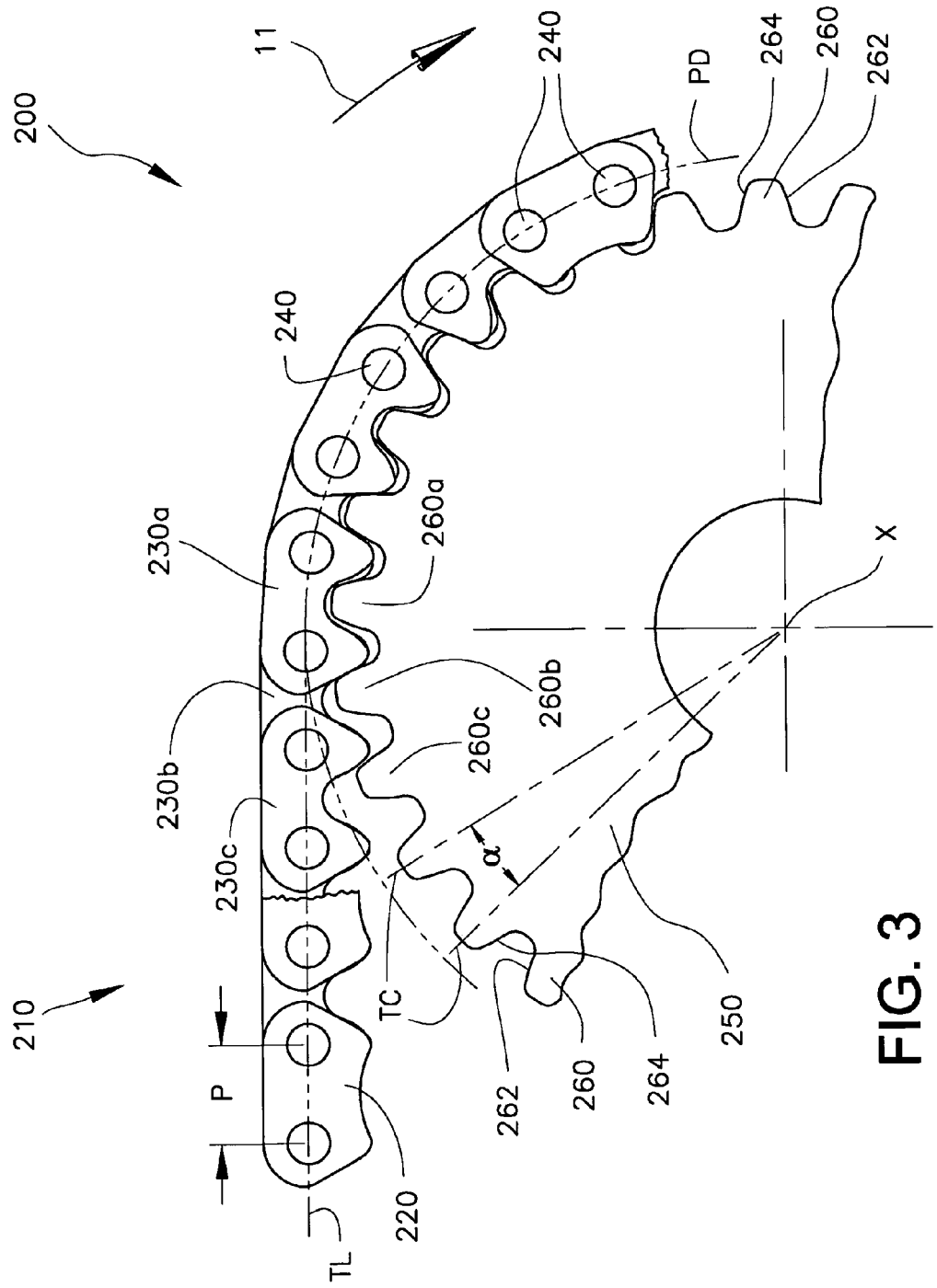
FIG. 3 is a partial front elevational view of an inverted tooth chain drive system with inside flank meshing formed in accordance with the present invention.

The inverted tooth chain 210 formed in accordance with the present invention is shown in FIGS. 2A and 2B. FIG. 2B is a plan view of the chain 210 and shows a standard chain lacing having rows 230a,230b,230c, etc. of interleaved inside links 230 connected in an endless fashion, with successive rows pivotally interconnected by pivot pins 240 installed in apertures 232. The pins 240 define pivot axes C about which the interconnected link rows 230a,230b,230c articulate relative to each other. In the case of round pins 240, the pivot axes C are the centers of the pins 240. The pivot axes C are evenly spaced from each other at a chain pitch distance P. The guide link plates 220 are not shown in FIG. 2A in order to reveal the underlying inside links 230, but some are shown in FIGS. 2B and 3. The inside links 230 can be assembled with other lacing configurations such as stacked links across a row if desired. Those of ordinary skill in the art will recognize that the term "pins" 240 as used herein is intended to encompass round pins, split pins, rocker joints and/or any other structure(s) that pivotally interconnect the link plates 230 of chain 210.

The chain 210 is configured for inside flank engagement at the onset of meshing with a sprocket. As shown in FIG. 2A, the inside link plates 230 each have teeth or toes 238 which are defined by inside flanks 235 and outside flanks 236 interconnected by a tip 237 defined by a radius and/or other convexly curved surface. The outside flanks 236 are straight-sided and the inside flanks 235 have a convexly arcuate form and are joined to each other by a crotch 234. In particular, the inside flanks 235 of the toes 238 of each link 230 are defined by a radius R that preferably blends into the tip 237 of the relevant toe 238 and into the crotch 234 at the opposite end.

FIG. 3 illustrates an inverted tooth chain drive system 200 defined to exhibit inside flank meshing formed in accordance with the present invention. The system 200 is comprised of inverted tooth chain 210 in meshing contact with a drive sprocket 250 and at least one other sprocket (not shown) as the sprockets rotate clockwise. The sprocket 250 includes a plurality of teeth 260 each having an engaging flank 262 and a disengaging flank 264 and, in the illustrated example, the teeth are symmetrical about their tooth centers TC and are all substantially identical. The illustrated tooth flanks 262 have an involute form, but can alternatively comprise a radial arc shape and/or comprise or be defined by a straight-sided profile (flat). It should be noted that most of the guide link plates 220 of chain 210 have been broken away or completely removed in FIG. 3 to reveal the underlying inside link plates 230 in order to facilitate an understanding of the present invention. In the illustrated example, the sprocket 250 rotates clockwise as indicated by the arrow 11.

With continuing reference to FIG. 3, the chain 210 (at the centers C of the chain pins 240) approaches the sprocket 250 along the tangent line TL in a taut strand and meshing occurs as the chain link plates 230 collide with an engaging flank tooth face 262. When the chain 210 moves into the wrap of the sprocket and is fully meshed with the sprocket 250, the centers C of the pins 240 travel along and define a circular path referred to as the pitch diameter PD.

Figure 4:
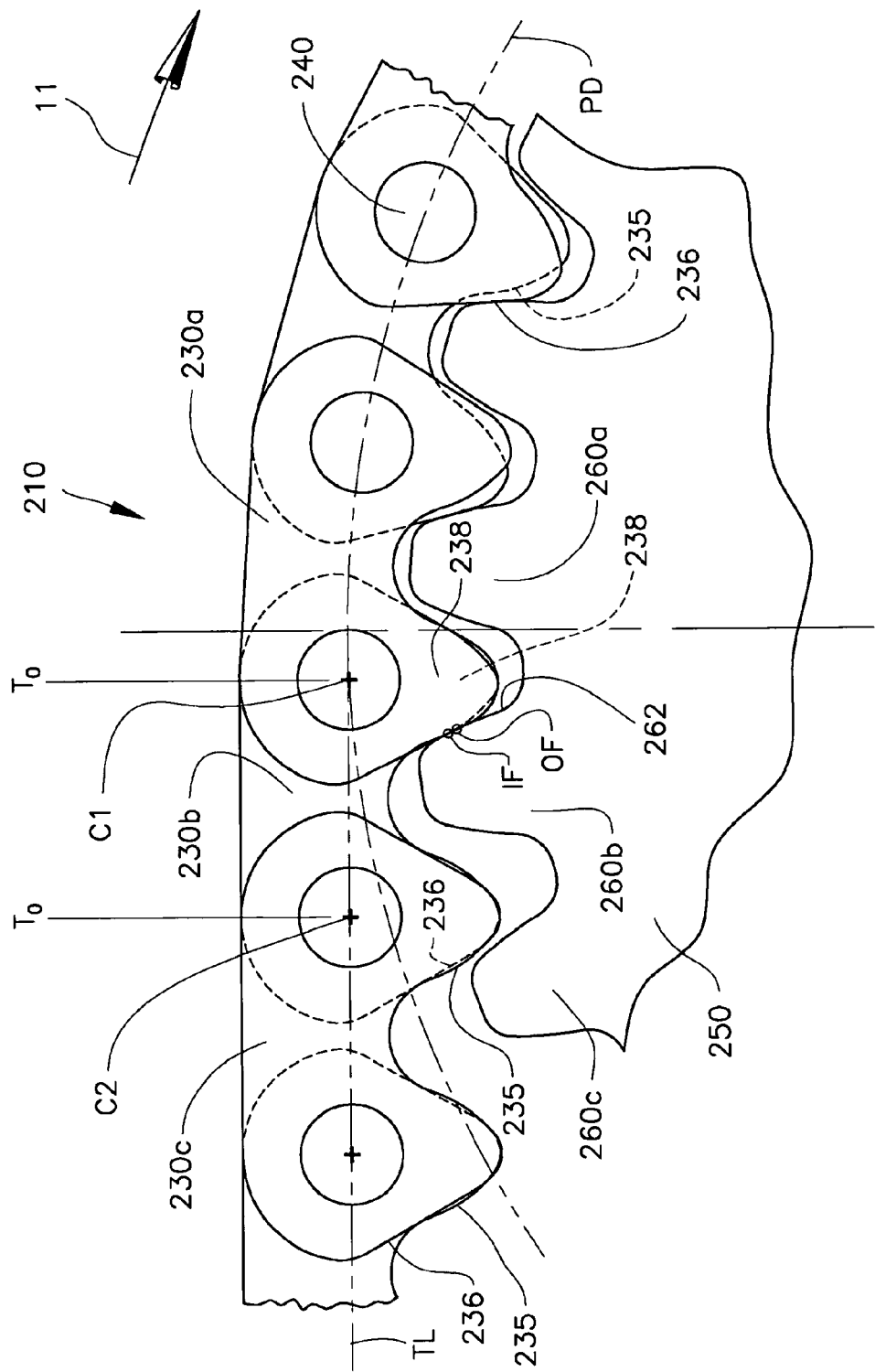
FIGS. 4-6 are enlarged views of the chain drive system of FIG. 3 with the chain in successive stages of engagement with the sprocket (FIG. 4 corresponds to the sprocket position shown in FIG. 3)

As shown in FIG. 3, and more clearly in FIG. 4, link plate rows 230a and 230b of chain 210 are shown at a point of simultaneous meshing contact with the engaging flank 262 of tooth 260b. The leading toes 238, in terms of chain movement direction, of the link plate row 230b have made inside flank meshing contact IF with the sprocket tooth 260b and link plate row 230a has just rotated to a position where its trailing toes 238, in terms of chain movement direction, have moved into outside flank meshing contact OF with the same sprocket tooth 260b at time $T_0$ to effect this simultaneous contact. Link plate row 230c is the next row to mesh with sprocket tooth 260c as the sprocket rotates clockwise about its center X (axis of rotation).

When the chain or a segment thereof is pulled straight (i.e., with at least three pin centers C arranged in a straight line) as shown in FIG. 2A (it's nominal orientation as it moves into engagement with the sprocket 250 from the upstream span during use), the leading inside flanks 235 project outwardly from the adjacent trailing outside flanks 236 of preceding link row by an inside flank projection distance λ (lambda). In direct contrast to conventional inverted tooth chains designed and built for inside flank engagement, however, the magnitude of the inside flank projection λ is purposefully minimized so as to minimize the polygonal effect of the chain 210 as it engages the sprocket 250 which, in turn, serves to minimize vibration in the unsupported chain span located upstream from the sprocket. On the other hand, the inside flank projection λ is defined to be greater than zero to provide the advantages of inside flank meshing as described herein. More particularly, the inside flank projection λ is defined to satisfy $0.010 \times P \leq \lambda_{MAX} \leq 0.020 \times P$ and most preferably in the range of $0.015 \times P \leq \lambda_{MAX} \leq 0.020 \times P$ where P is chain pitch and $\lambda_{MAX}$ is the maximum inside flank projection. Meshing chordal action is beneficially reduced when offset λ is minimized. A minimum value for λ is determined by the related component manufacturing tolerances such that inside flanks 235 of a row 230a always projects outwardly relative to the outside flanks 236 of a preceding row 230b when the chain is stretched straight.

For each row 230a, 230b, 230c, etc. of chain links 230, at the instant of initial contact between the link plates 230 of a row and a tooth 260 of the sprocket 250, only the leading inside flanks 235 of the chain row contact the engaging flank 262 of the sprocket tooth 260; at this initial stage, the outside flanks 236 of the preceding row do not contact the tooth 260 and are spaced therefrom. This engagement design is referred to herein as "inside flank engagement" and is deemed to be desirable to minimize noise and vibration associated with the chain drive. As a link plate row 230a, 230b, 230c moves into the wrap, articulation of the chain causes the leading inside flanks 235 of the row to separate from the engaging flank 262 and causes the trailing outside flanks 236 of the preceding link row to move into contact with the engaging flank 262.

The inside flank engagement and other advantages of a chain defined according to the present invention, such as the chain 210, will be apparent to those of ordinary skill in the art with reference to FIGS. 4-7. Referring again to FIG. 4, chain link row 230c has not yet made initial contact with tooth 260c of the sprocket 250 but, as described above, the sprocket has rotated to a position where link row 230b of chain 210 has its leading inside flanks 235 in contact with engaging flank 262 of sprocket tooth 260b at location IF and the link plate row 230a has articulated to a point where its trailing outside flanks 236 are in simultaneous meshing contact with the engaging flank 262 of the same sprocket tooth 260b at location OF, i.e., the chain 210 is shown transitioning from inside flank contact (link row 230b) to outside flank contact (link row 230a). This transition from the inside flank contact of link row 230b to the outside flank-to-tooth contact of link row 230a is not believed to contribute in any significant measure to the meshing impact noise levels in that the initial meshing and driving engagement of the chain links with the engaging flank 262 of sprocket tooth 260b occur at the inside flanks 235 at the onset of meshing, and it is this initial chain-sprocket meshing impact that is believed to be the major noise source for inverted tooth chain drives. It is important to note that inside flanks 235 of link row plates 230b will begin to separate from meshing contact with engaging flank 262 of sprocket tooth 260b with the next increment of sprocket rotation. It should also be noted that the link rows preceding link row 230a, i.e., the link rows 230 in the wrap, are fully meshed with the sprocket 250 and these link rows contact an engaging flank 262 of a sprocket tooth 260 with only their trailing outside flanks 236, because the leading inside flanks 235 of each row in the wrap have moved out of contact with the engaging flank 262 of the preceding tooth. As shown, the leading outside flanks 236 of each link row 230 in the wrap do not make hard contact with a disengaging flank 264 of a sprocket tooth 260, but they can without departing from the overall scope and intent of the invention, i.e., a link row 230 in the wrap can optionally have its leading outside flanks 236 in hard contact with the disengaging flank 264 of a sprocket tooth 260 located two teeth forward from the tooth with which its trailing outside flanks 236 are engaged. At time $T_0$ the centers C1,C2 of pins 240 for the link row 230b are located as shown and as described in full detail below with reference to FIG. 7A.

Figure 5:
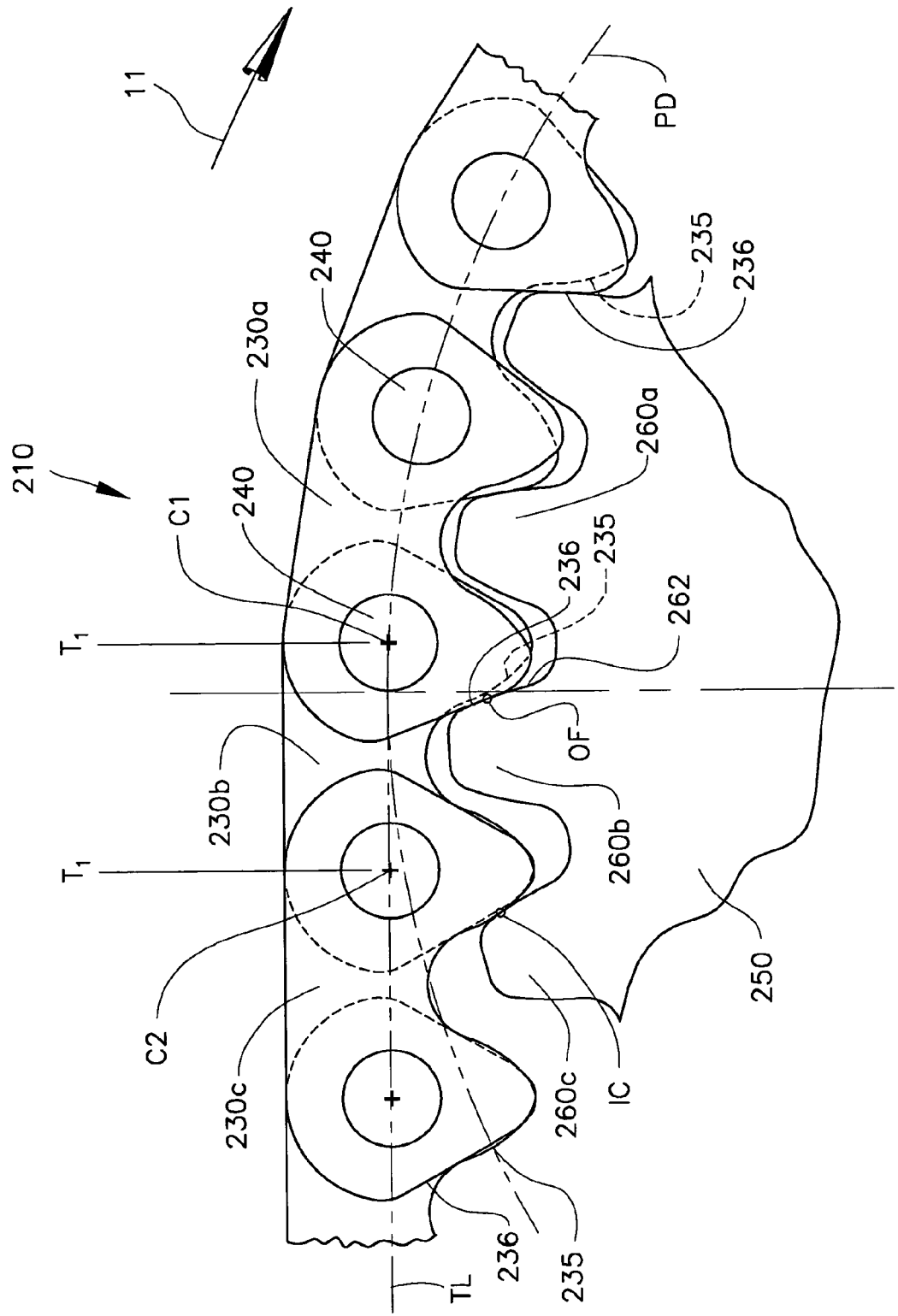

As illustrated in FIG. 5, the sprocket 250 has been rotated in a clockwise direction and link row 230c of the chain is at the onset of meshing contact with tooth 260c at time $T_1$, making initial contact with the sprocket on the leading inside flanks 235 of the link row 230c owing to the above-described inside flank projection λ. At the instant when inside flanks 235 of link row 230c make initial contact with sprocket tooth 260c at location IC, the trailing outside flanks 236 of row 230a that came into meshing contact at time $T_0$ will remain substantially in hard contact with the engaging flank 262 of tooth 260b until this link row exits the sprocket wrap into the slack strand. At time $T_1$ the centers C1,C2 of pins 240 for the link row 230b are located as shown and as described in full detail below with reference to FIG. 7A.

Figure 6:
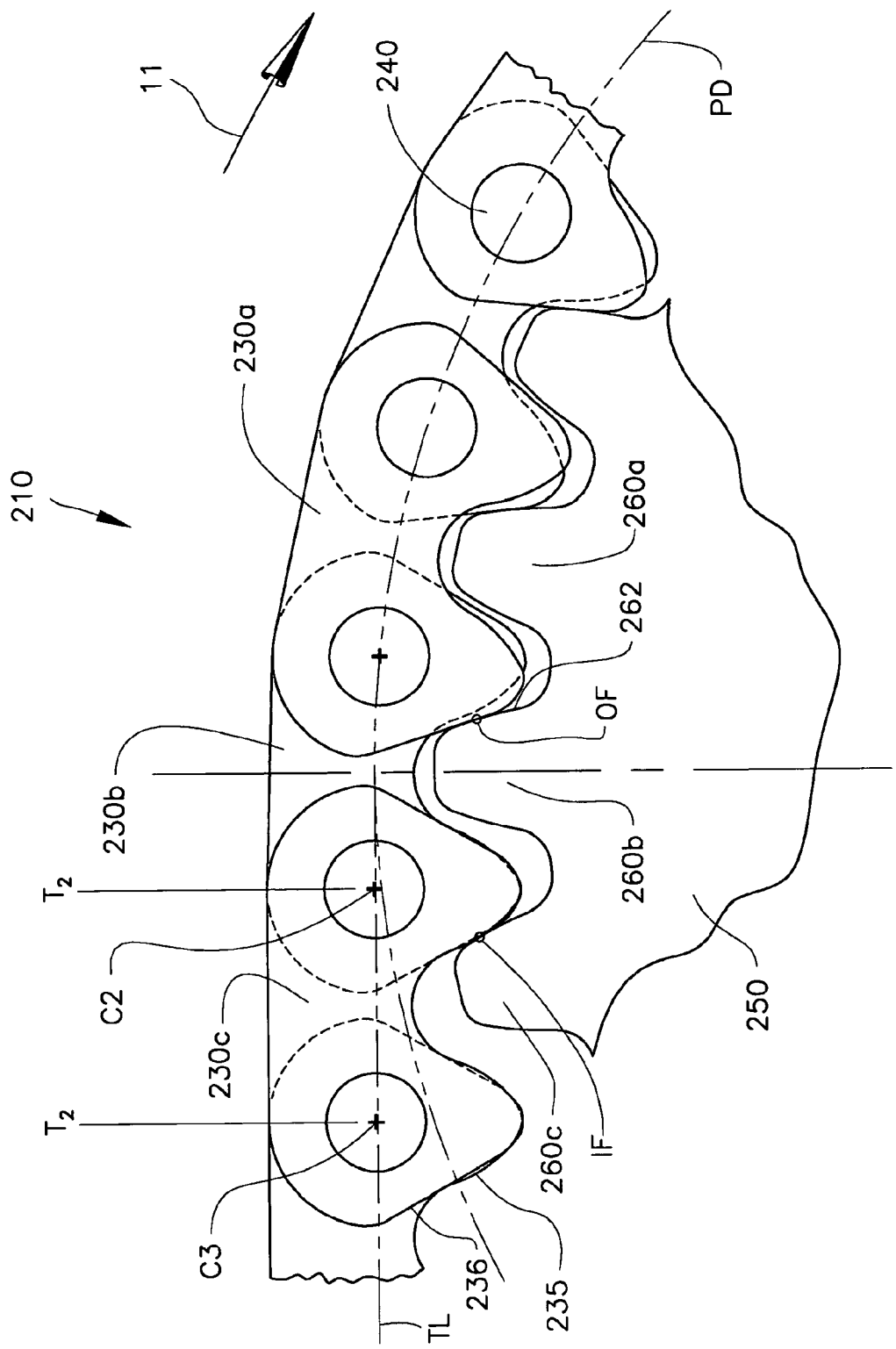

In FIG. 6, the sprocket 250 is shown at time $T_2$ where it has rotated still further in the clockwise direction to illustrate this meshing sequence. Because the inside flank projection λ is minimized as described above, the chordal movement of the chain 210 as it moves from initial contact to the full mesh position is correspondingly minimized, unlike prior art chains which intentionally introduce extreme lift into the chain strand upon initial contact with the sprocket. At time $T_2$ the centers C2,C3 of pins 240 for the link row 230c are located as shown and as described in full detail with reference to FIG. 7A.

It should be stressed that the inside flank 235 meshing contact between the chain 210 and sprocket 250 begins and ends on the radius R of inside flank surfaces 235 for each row 230a,230b,230c, etc. of the chain 210. Also, as noted, the meshing contact transition from inside flanks 235 of a row to outside flanks 236 of a preceding row beneficially occurs prior to initial meshing contact for the next meshing link row as shown in FIGS. 4 and 5.

Figure 1B:
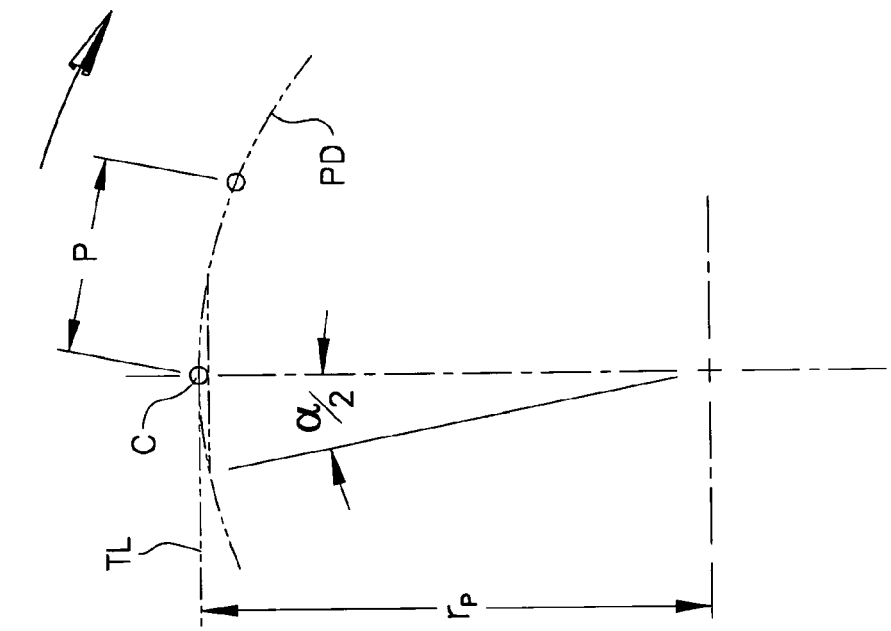
FIGS. 1A and 1B illustrate the chordal rise for a sprocket and the related displacement of a chain pin as it moves through an angle α/2 upon meshing engagement with a sprocket.
Figure 1A:
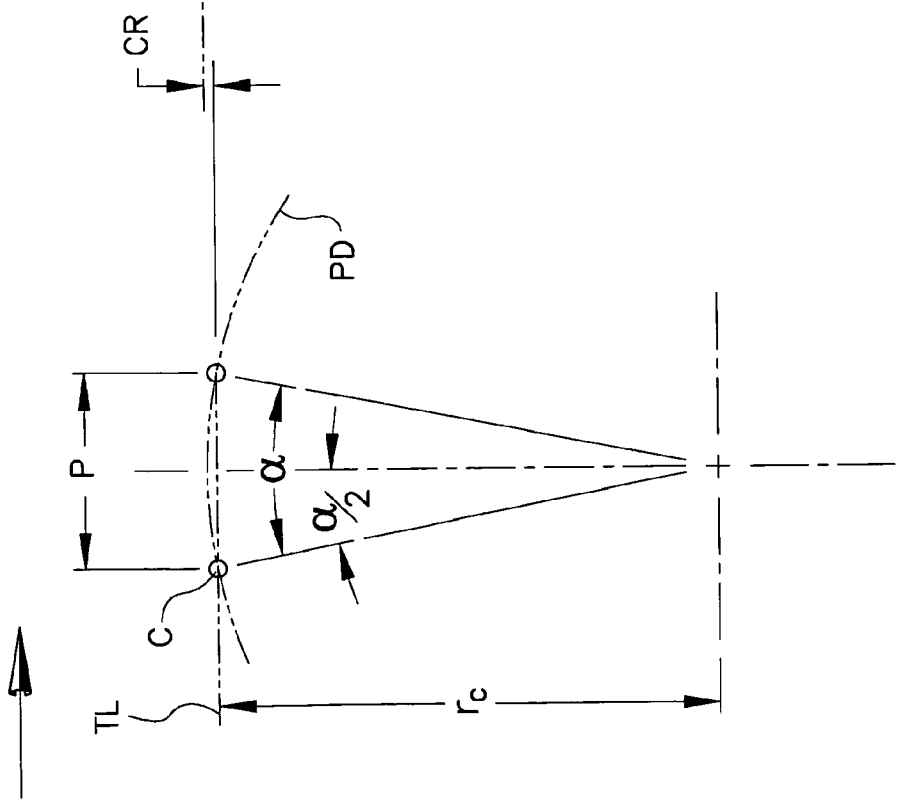
Figure 7A:
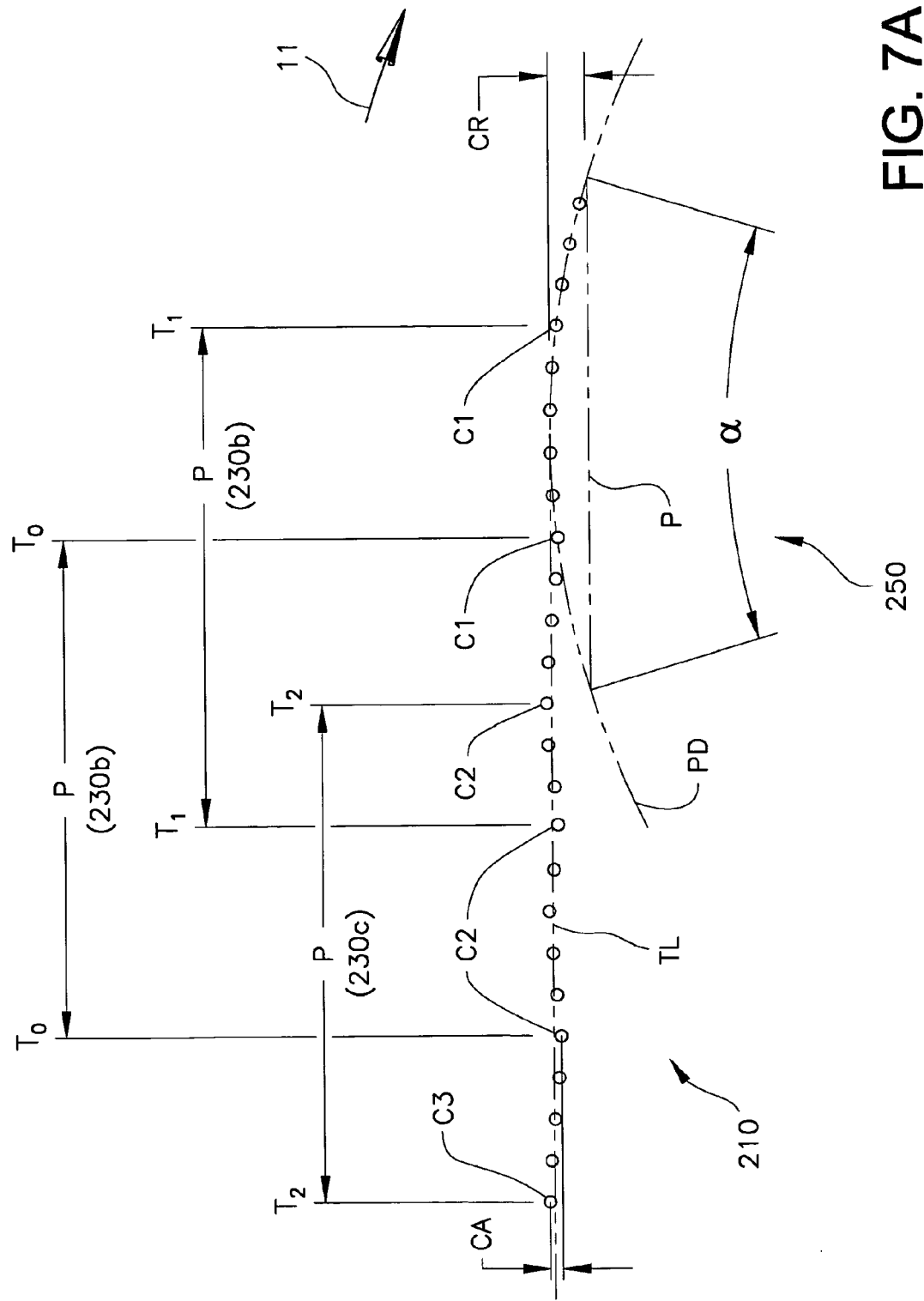
FIG. 7A is a diagrammatic illustration of the chain meshing geometry for the inverted tooth chain drive system shown in FIG. 3 and formed in accordance with the present invention.

FIG. 7A partially illustrates the sprocket 250 that defines a tooth angle α and a sprocket chordal pitch P as defined above in connection with FIGS. 1A and 1B. As shown, a chordal rise CR is thus defined between the line P representing the sprocket chordal pitch and the tangent line TL along which the pins 240 ideally approach the sprocket for engagement (the sprocket chordal pitch P is theoretically identical to the chain pitch P but, in practice, the chain pitch will exceed P and the sprocket chordal pitch will be less than P due to manufacturing tolerances). With conventional inverted tooth chains using inside flank meshing, the prominence of the inside flanks of the chain in combination with the chordal action results in the meshing chain span having transverse oscillatory chain movement that can approach or equal the chordal rise distance CR owing to excessive inside flank projection. According to the present invention, however, the inside flank projection λ is minimized as described above and effectively restricts transverse chordal motion or "chordal action" CA in the meshing span of the chain 210 about the tangent line TL so that the transverse movement of the chain is limited to a range of 30% to 40% of the chordal rise CR distance.

The above-described meshing kinematics are diagrammatically illustrated further in FIG. 7A which is enlarged relative to FIGS. 4-6, but which includes the same time indicators $T_0,T_1,T_2$ which correspond respectively to the chain/sprocket positions shown in FIGS. 4-6. More particularly, the pin centers C1,C2,C3 for the link rows 230b,230c of chain 210 are shown at times $T_0,T_1,T_2$ which correspond to the times $T_0,T_1,T_2$ of FIGS. 4-6, respectively. For each set of time indicators $T_0,T_1,T_2$, the distance between the centers is equal to the chain pitch P. At time $T_0$ the pin center C1 is located on the pitch diameter PD and is slightly below the tangent line TL, and the pin center C2 is the same distance below the tangent line TL as C1 in that the tangent line is assumed to be horizontal. At time $T_1$ the pin centers C1,C2 are shown to be slightly below the tangent line TL. At time $T_2$ the pin center C2 is approaching the pitch diameter PD and both pin centers C2,C3 are slightly above the tangent line TL due to the meshing geometry.

Figure 7B:
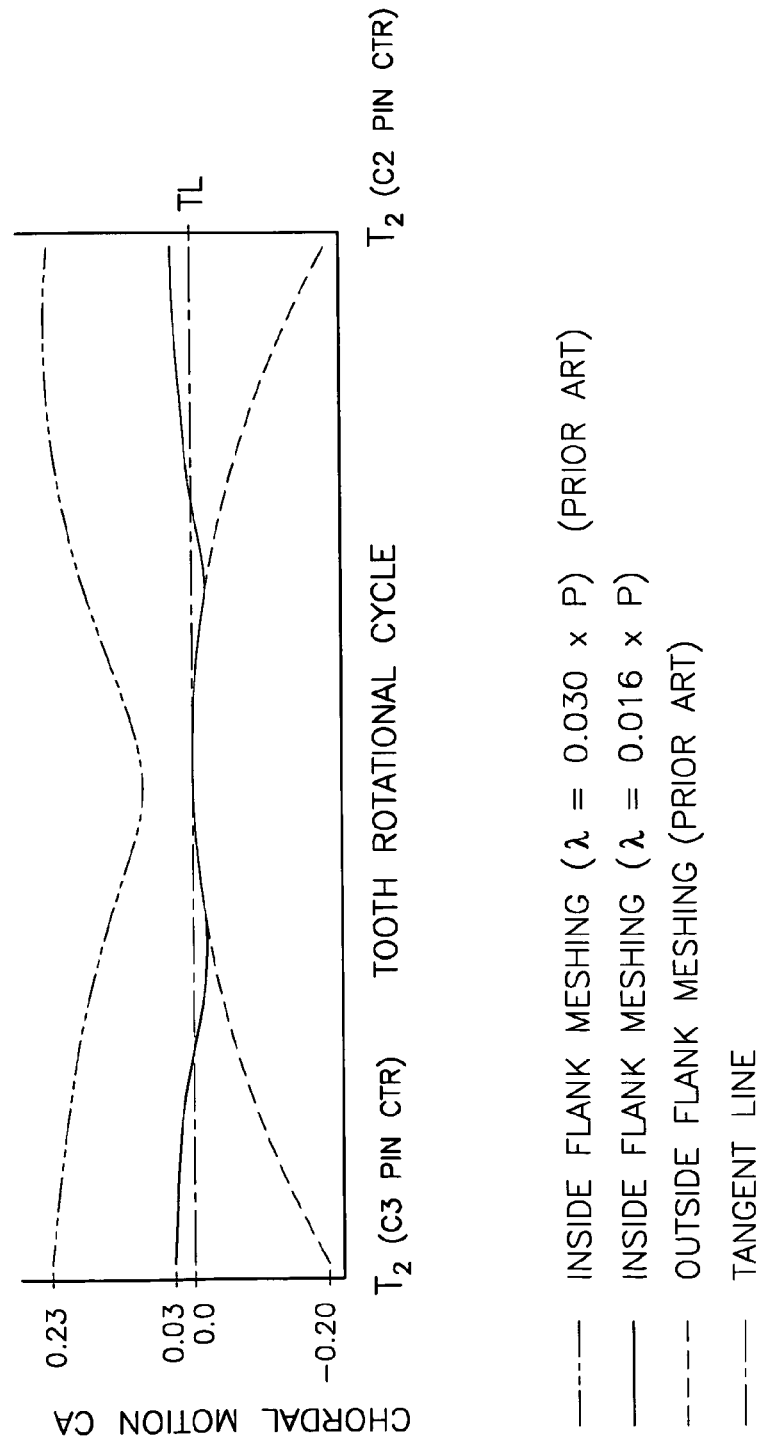
FIGS. 7B and 7C are graphical representations of the meshing polygonal action of various inside link configurations compared to the chain drive system formed in accordance with the present invention.
Figure 7C:
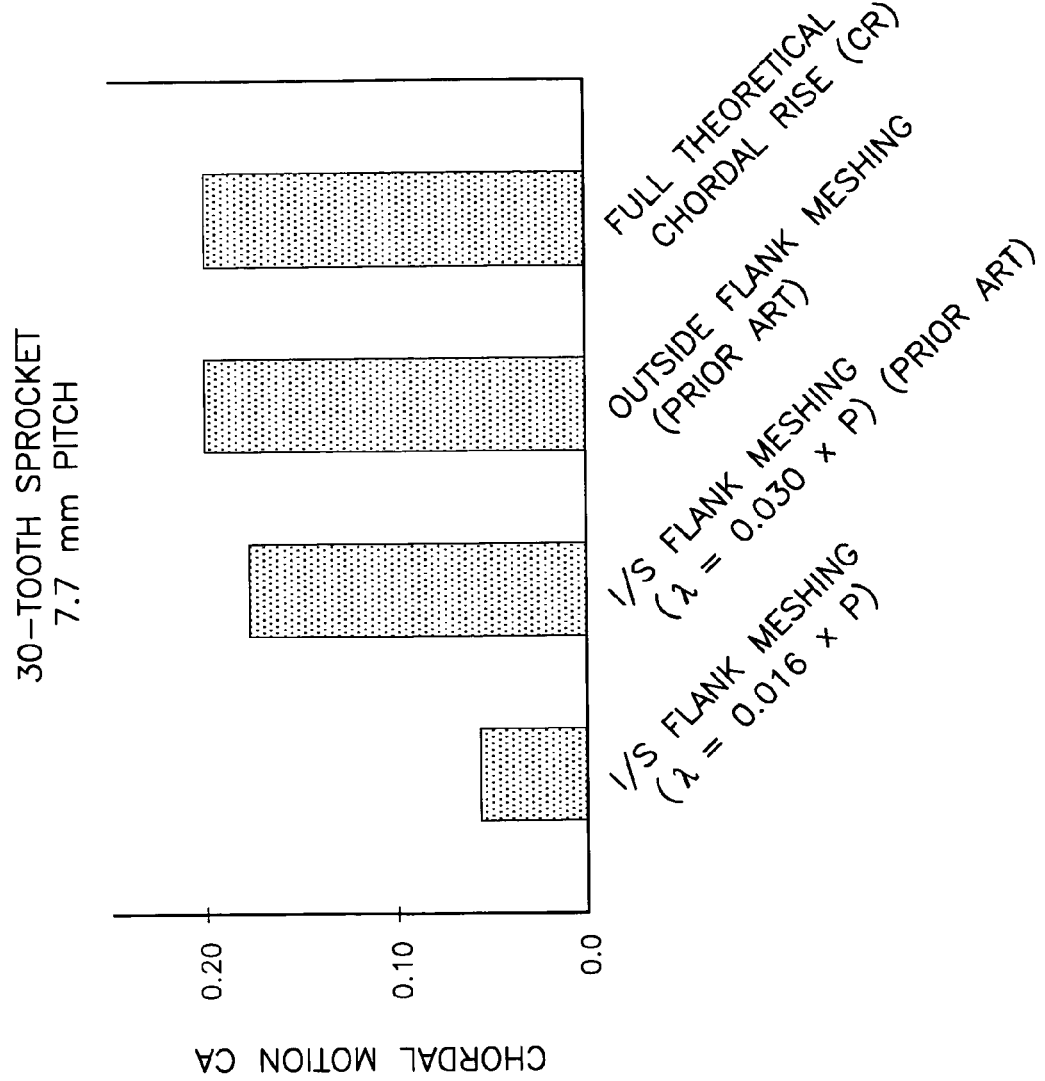

FIG. 7B illustrates the meshing chordal motion of a chain 210 defined in accordance with of the present invention compared to prior art chains. There, it can be seen that the solid line results associated with a chain defined according to the present invention, with an inside flank projection λ=0.016*P, have the least amount of undesired chordal motion and show that the pin centers travel closest to the tangent line as is most preferred so reducing noise and vibration. FIG. 7C depicts the data shown in FIG. 7B in bar graph form. Those of ordinary skill in the art will recognize that, for a chain 210 defined according to the present invention, the vertical motion or chordal action CA of the pin centers C1,C2,C3 is much less than the chordal rise distance CR unlike conventional inverted tooth chain drive systems with inside flank engagement.

In an alternative embodiment, the sprocket 250 is replaced with a sprocket having a combination of standard tooth profiles and flank-relieved tooth profiles such as the sprocket disclosed in co-pending and commonly assigned U.S. patent application Ser. No. 11/210,599 filed Aug. 24, 2005, and the disclosure of U.S. patent application Ser. No. 11/210,599 is hereby expressly incorporated by reference into this specification.

The invention has been described with reference to preferred embodiments. Modifications will occur to those of ordinary skill in the art, and it is intended that the invention be construed as encompassing all such modifications.

The invention claimed is:

1. A chain and sprocket drive system comprising:
   a sprocket with a plurality of teeth, wherein each tooth comprises an engaging flank and a disengaging flank;
   an inverted tooth chain meshed with the sprocket, said sprocket and chain defining a maximum chordal rise distance CR, and said inverted tooth chain comprising a plurality of rows of inside links that each articulate relative to a preceding row and a succeeding row about pivot axes spaced at a chain pitch P, each of said rows comprising leading inside toe flanks and trailing outside toe flanks, wherein the leading inside toe flanks of each row project outwardly relative to trailing outside toe flanks of the preceding row by a maximum projection amount $\lambda_{MAX}$ when said inverted tooth chain is pulled straight, wherein $0.010 \times P \leq \lambda_{MAX} \leq 0.020 \times P$, so that:
   the engaging flank of each sprocket tooth makes initial meshing contact with a meshing link row of said inverted tooth chain only on the leading inside flanks of the meshing link row of said chain;
   the leading inside flanks of the meshing link row and the trailing outside flanks of a preceding link row move into simultaneous meshing contact with the engaging flank after said initial contact such that said preceding link row is fully meshed with said sprocket when its trailing outside flanks make contact with said engaging flank;
   said simultaneous meshing contact occurs before a next meshing link row of said chain contacts said sprocket;

said leading inside flanks of said meshing link row separate from the engaging flank after said simultaneous meshing contact; and, a strand of said chain located upstream from said sprocket exhibits chordal motion that is no more than 40% of said maximum chordal rise distance CR.

2. The chain and sprocket drive system as set forth in claim 1, wherein the strand of said chain located upstream from said sprocket exhibits chordal motion that is no more than 30% of said maximum chordal rise distance CR.

3. The chain and sprocket drive system as set forth in claim 1, wherein said maximum inside flank projection amount $\lambda_{MAX}$ satisfies the relationship:

$$0.015 \times P \leq \lambda_{MAX} \leq 0.020 \times P.$$

4. The chain and sprocket drive system as set forth in claim 3, wherein said initial meshing contact with the engaging flank of a sprocket tooth for the leading inside flanks of each row occurs only after the leading inside flanks of the preceding row have separated from the engaging flank of a preceding sprocket tooth.

5. The chain and sprocket drive system as set forth in claim 3, wherein said leading inside flanks of each row of said sprocket are defined by an arcuate radius of curvature.

6. An inverted tooth chain for a chain and sprocket drive system comprising:

a plurality of rows of inside links interconnected to each other in an endless fashion and that each articulate relative to a preceding row and a succeeding row about pivot axes spaced at a chain pitch P, each of said rows comprising leading inside toe flanks and trailing outside toe flanks, wherein the leading inside toe flanks of each row project outwardly relative to trailing outside toe flanks of the preceding row by a maximum projection amount $\lambda_{MAX}$ when said inverted tooth chain is pulled straight so that the engaging flank of an associated sprocket tooth makes initial meshing contact with said inverted tooth chain only on the leading inside flanks of a row of said chain, wherein said maximum inside flank projection amount $\lambda_{MAX}$ satisfies the relationship:

$$0.010 \times P \leq \lambda_{MAX} \leq 0.020 \times P.$$

7. The inverted tooth chain as set forth in claim 6, wherein said maximum inside flank projection amount $\lambda_{MAX}$ satisfies the relationship:

$$0.015 \times P \leq \lambda_{MAX} \leq 0.020 \times P.$$

8. The inverted tooth chain as set forth in claim 7, wherein when said inverted tooth chain is meshed with an associated sprocket, a preceding row transitions from inside flank contact to outside flank contact with a sprocket tooth before a meshing row that follows said preceding row makes initial meshing contact with a following sprocket tooth.

9. A method for meshing an inverted tooth chain with a sprocket, said method comprising:

rotating a sprocket, said sprocket comprising a plurality of teeth, wherein each tooth comprises an engaging flank and a disengaging flank;

meshing an inverted tooth chain with the sprocket, wherein said sprocket and chain define a maximum chordal rise distance CR, and wherein said inverted tooth chain comprises a plurality of rows of inside links that each articulate relative to a preceding row and a succeeding row about pivot axes spaced at a chain pitch P, each of said rows comprising leading inside toe flanks and trailing outside toe flanks, wherein the leading inside toe flanks of each row project outwardly relative to trailing outside toe flanks of the preceding row by a maximum projection amount $\lambda_{MAX}$ when said inverted tooth chain is pulled straight, wherein said maximum inside flank projection amount $\lambda_{MAX}$ satisfies the relationship:

$$0.015 \times P \leq \lambda_{MAX} \leq 0.020 \times P;$$

making initial meshing contact between the engaging flank of a first sprocket tooth and said inverted tooth chain only on the leading inside flanks of the first row of;

continuing to rotate said sprocket so that a row of said chain that precedes said first row becomes fully meshed with said sprocket with its trailing outside flanks in contact with said first sprocket tooth and so that said leading inside flanks of the first row separate from the first sprocket tooth.

10. The method as set forth in claim 9, further comprising, after said leading inside flanks of the first row separate from the first sprocket tooth, continuing to rotate said sprocket so that the leading inside flanks of a second row of said chain that succeeds said first row make initial meshing contact with a second sprocket tooth that follows said first sprocket tooth.

11. The method as set forth in claim 9, wherein a span of said chain upstream from said sprocket exhibits chordal motion that is less than 40% of said maximum chordal rise distance CR.

12. An inverted tooth chain comprising:

a plurality of rows each pivotally connected to a preceding row and a following row, wherein each row comprises a plurality of inside links aligned with each other and interleaved with the inside links of its preceding and following rows, and wherein each row pivots relative to its preceding and following rows about pivot axes spaced from each other at a pitch distance P;

each of said inside links comprising a leading toe and a trailing toe, wherein each leading toe and trailing toe comprise an inside flank and an outside flank interconnected by a tip, said inside flanks of the leading and trailing toes joined by a crotch;

said leading toes of each chain row overlapping said trailing toes of a preceding chain row so that, when a row and a preceding row are positioned in a straight line, said inside flanks of the leading toes of said chain row project outwardly relative to said outside flanks of said trailing toes of said preceding chain row by a maximum amount $\lambda_{MAX}$ wherein:

$$0.010 \times P \leq \lambda_{MAX} \leq 0.020 \times P.$$

13. The inverted tooth chain as set forth in claim 12, wherein said maximum inside flank projection amount $\lambda_{MAX}$ satisfies the relationship:

$$0.015 \times P \leq \lambda_{MAX} \leq 0.020 \times P.$$

14. The inverted tooth chain as set forth in claim 13, further comprising a sprocket meshed with the chain, said sprocket and chain together determining a maximum chordal rise distance CR for said pivot axes of said chain, wherein the pivot axes of said chain in a portion of said chain located upstream from said sprocket exhibit chordal motion in response to chordal action of said chain as it meshes with said sprocket, wherein said chordal motion in said upstream chain span is less than 40% of said maximum chordal rise distance CR.

15. An inverted tooth chain comprising:

a plurality of rows pivotally connected to each other in an endless fashion and defining a chain pitch P between pivot axes about which said rows articulate relative to each other, each row comprising a plurality of link plates wherein each link plate comprises a leading toe and a trailing toe, each toe defined by an inside flank and an outside flank connected by a tip, with said inside flanks of said leading and trailing toes oriented toward each other and connected by a crotch;

said links of each row interleaved with said links of a preceding row and with the links of a succeeding row, with the leading toes of each row overlapped with the trailing toes of the preceding row such that, when the chain is pulled straight, the inside flanks of the leading toes project outwardly from the outside flanks of the overlapped trailing toes by an a maximum amount $\lambda_{MAX}$ wherein:

$$0.010 \times P \leq \lambda_{max} \leq 0.020 \times P.$$

16. The inverted tooth chain as set forth in claim 15, wherein said maximum inside flank projection amount $\lambda_{MAX}$ satisfies the relationship:

$$0.015 \times P \leq \lambda_{MAX} \leq 0.020 \times P.$$

* * * * *